No. 880,991. PATENTED MAR. 3, 1908.
J. M. VON HASSEL.
TESTING APPARATUS.
APPLICATION FILED JULY 18, 1907
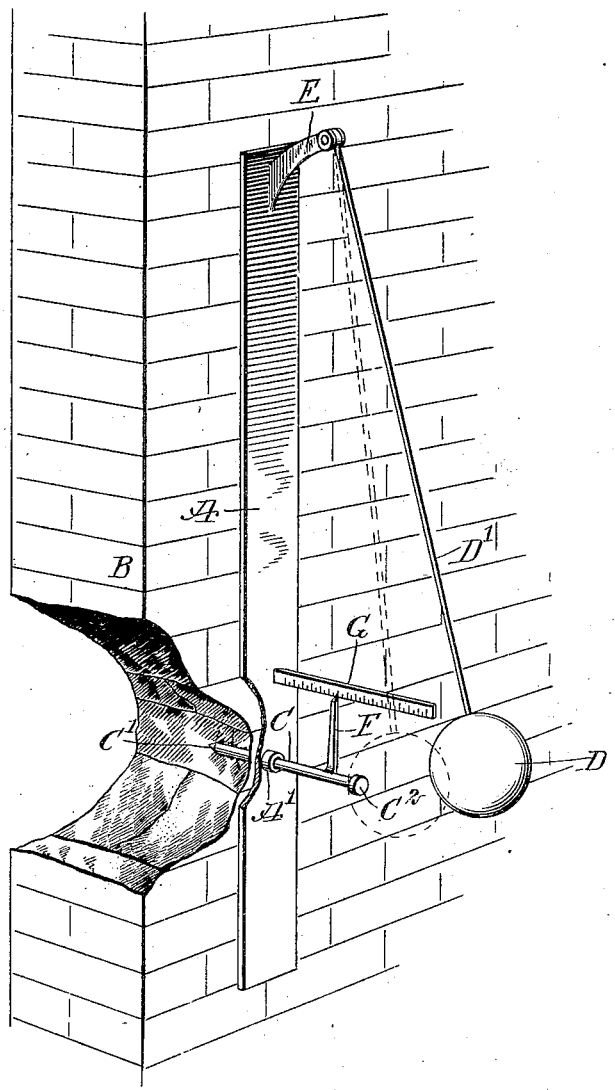
WITNESSES:
INVENTOR
Jorge M. von Hassel
BY
ATTORNEYS

UNITED STATES PATENT OFFICE.

JORGE MAXIMILIANO VON HASSEL, OF LIMA, PERU.

TESTING APPARATUS.

No. 880,991.  Specification of Letters Patent.  Patented March 3, 1908.

Application filed July 18, 1907. Serial No. 384,400.

*To all whom it may concern*

Be it known that I, JORGE MAXIMILIANO VON HASSEL, a subject of the German Emperor, and a resident of Lima, Peru, have invented a new and Improved Testing Apparatus, of which the following is a full, clear, and exact description.

The invention relates to apparatus for testing the strength of materials, and its object is to provide a new and improved testing apparatus, more especially designed for testing the resistance or strength of air dried bricks and similar materials used in building houses, with a view to determine whether the walls of such houses are safe or of sufficient strength to bear another story or to allow the use of heavy machinery in the building, etc.

The invention consists of novel features and parts and combinations of the same which will be more fully described hereinafter and then pointed out in the claims.

A practical embodiment of the invention is represented in the accompanying drawing forming a part of this specification, in which the figure is a perspective view of the improvement as applied for testing the strength of the bricks in a wall.

The improved testing apparatus is mounted on a suitably constructed frame A, preferably in the shape of a board adapted to be applied to the face of a wall B, the bricks of which are to be tested according to their resistance or strength. On the frame A is arranged a bearing A', in which is mounted to slide a penetrating tool C in the form of a bar having a pointed end C' and a head $C^2$, the latter being adapted to be engaged by a weight or hammer-head D, provided with a shank D' mounted to swing from a bracket E attached to the frame A.

On the penetrating tool C, adjacent to the head $C^2$, is secured a pointer F, indicating on a gage G on the frame A and graduated, to indicate linear measurement, to allow of reading the distance the penetrating tool passes into the brick on each blow of the weight or hammer-head D.

In using the device, the frame A is placed against the face of the wall B, as shown, with the point C' of the tool C resting against the outer face of the brick. The operator now imparts a swinging motion to the weight or hammer-head D, so that the same strikes a blow on the head $C^2$, to cause the point C' of the penetrating tool C to penetrate a distance into the material of the brick, the distance penetrated being indicated by the pointer F on the graduated gage G. Thus, by one or a number of successive blows the resistance of the brick material can be readily tested, it being understood that the penetrating power of the resistance tool C for a normal brick is well known, and ready comparison can be had by the use of the pointer F and gage G, to indicate the ratio between the resistance which the brick of the wall affords to the penetrating tool C and the resistance of the normal brick.

It is understood that the resistance of an air dried brick, for instance, is in exact proportion to the binding quality of its ingredients; that is, the greater the binding quality the greater the resistance.

From the foregoing it will be seen that by the use of the simple device shown and described, a person is enabled to quickly determine whether the wall of a building is safe, or of sufficient strength to bear another story, or allow the use of heavy machinery in the building, etc.

Having thus described my invention, I claim as new and desire to secure by Letters Patent:—

1. An apparatus for testing the strength of materials, comprising a frame, a penetrating pointed tool mounted to slide on the said frame and provided with a pointer, a gage held on the frame and on which indicates the said pointer, and a driving device for imparting a sliding motion to the said pointed tool.

2. An apparatus for testing the strength of materials, comprising a frame, a penetrating pointed tool mounted to slide on the said frame and provided with a pointer, a gage held on the frame and on which indicates the said pointer, and a weight having an arm fulcrumed on the said frame, the weight being adapted to swing and strike the head of the said pointed tool.

In testimony whereof I have signed my name to this specification in the presence of two subscribing witnesses.

JORGE MAXIMILIANO VON HASSEL.

Witnesses:
 JUAN HERRERA.
 GUY KING.